UNITED STATES PATENT OFFICE.

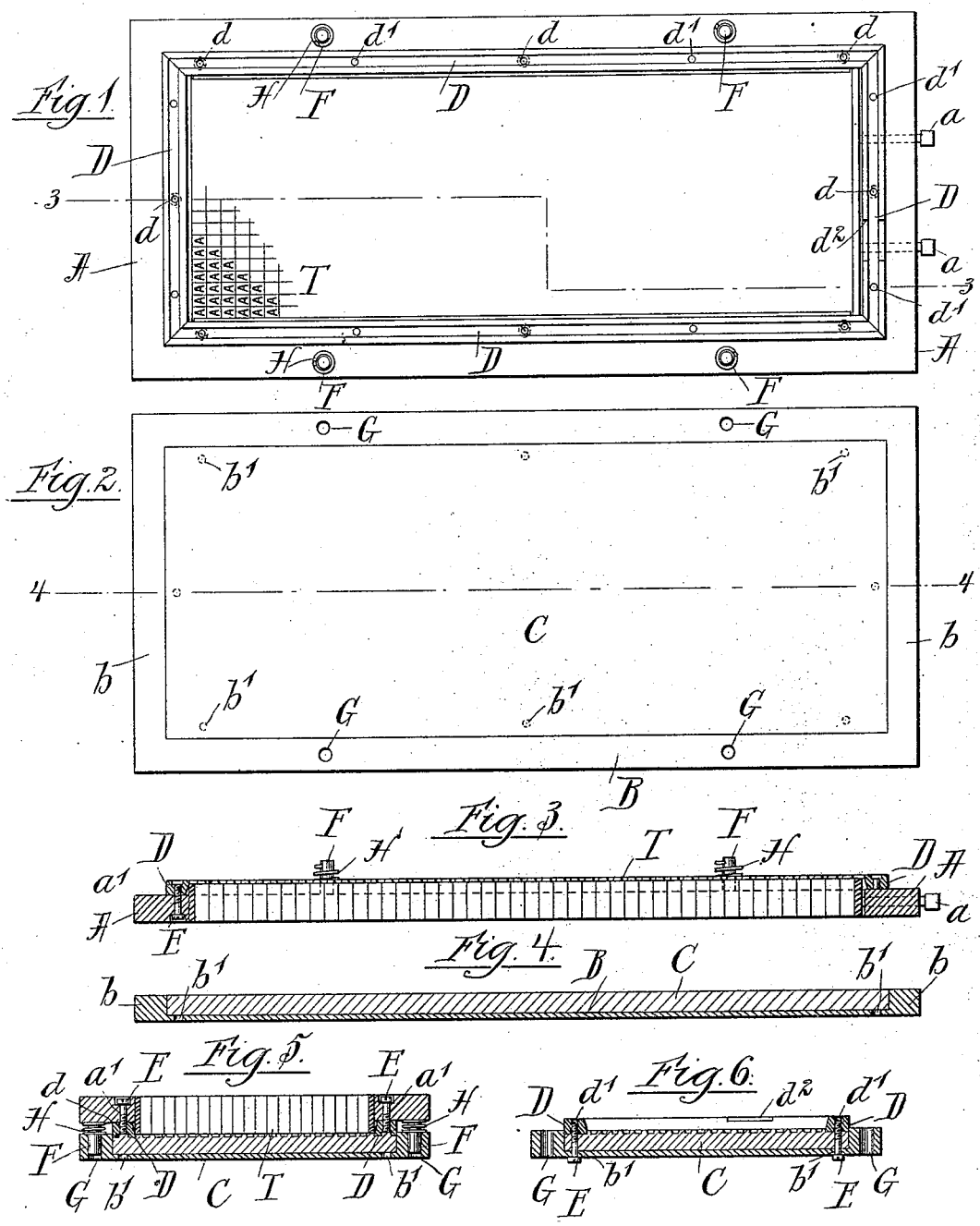

LOUIS K. SCOTFORD, OF CHICAGO, ILLINOIS.

METHOD OF AND APPARATUS FOR MAKING RUBBER TYPE.

SPECIFICATION forming part of Letters Patent No. 528,308, dated October 30, 1894.

Application filed May 10, 1894. Serial No. 510,765. (No model.)

*To all whom it may concern:*

Be it known that I, LOUIS K. SCOTFORD, of Chicago, in the county of Cook and State of Illinois, have invented a certain new and useful Improved Method of and Apparatus for Making Rubber Type; and I do hereby declare that the following is a full, clear, and exact description thereof, reference being had to the accompanying drawings, and to the letters of reference marked thereon, which form a part of this specification.

This invention relates to an improved method of an apparatus for making rubber type, and it consists in the matters hereinafter described and pointed out in the appended claims.

In carrying out my invention I propose to employ the same general plan heretofore used in making matrices by which the type is molded; that is to say, the matrix is made for the use of a suitable plastic material which is pressed against metal type and engraved relief plate or the like when in a soft state and then allowed to harden so as to form a mold. The matrix thus made is used to form a rubber type sheet by pressing the rubber when in a plastic or unvulcanized state against the surface of the matrix, and then vulcanizing the rubber.

The improvements constituting my invention embrace the steps of securing the metal type or relief plate which is to be duplicated in the metal frame or chase, then securing to the chase around the type therein spacing strips so disposed as to completely surround the body of type, then placing the plastic material which is to form a matrix on a suitable plate or backing, preferably provided with side walls, to confine the plastic material at its edges, then placing the face of the plastic material against the type and forcing it against the same by pressure applied to the backing plate, and then detaching the spacing strips from the chase and securing them to the backing plate of the matrix. The spacing strips thus attached to the matrix constitute side walls for the same which serve to define the edges or outline of the rubber sheet which is pressed against the matrix, and also to give a desired and uniform thickness to such rubber sheet by limiting the approach of the pressing surface or platen of the vulcanizing press toward the face of the matrix and thus giving the bodies of the rubber type which are cut from the type sheet a uniform length or height.

While the process above outlined may be carried out by any suitable apparatus or implements, yet I have herein shown the special form of apparatus for the purpose by which the process may be more conveniently carried out, this apparatus also constituting part of my invention. Such apparatus is shown in one convenient form in the accompanying drawings, in which—

Figure 1 is a face view of a chase with metal type secured therein, and spacing bars applied to the chase around the type; Fig. 2, a face view of a recessed plate which forms a backing to hold the plastic material from which the matrix is made. Fig. 3 is a sectional view of the chase shown in Fig. 1 taken on line 3—3 of said figure. Fig. 4 is a sectional view of the recessed plate shown in Fig. 2 taken on line 4—4 of said Fig. 2. Fig. 5 is a cross section of the chase and recessed plate showing them placed together in the position they occupy when the matrix is being formed. Fig. 6 is a sectional view through the finished matrix showing the placing strips attached thereto.

As illustrated in said drawings, A indicates a chase or metal frame for holding type of common construction, the same being herein shown as provided at one end with two set screws *a a* by which the type may be locked in the chase.

B, Figs. 2 and 4, is a recessed plate having marginal side walls *b b* which are raised above the face of the plate so as to form a recess in which is placed a body C of plastic material of which the matrix proper is formed.

D D are spacing bars or strips of proper length to surround the several sides of the type form T in the chase A and to enter within the walls *b b* of the recessed plate B in a manner shown in Fig. 5. Said spacing bars or strips D are adapted for attachment either to the chase A or to the plate B by suitable securing devices of such character as to enable the said spacing bars or strips D to be easily detached from one part and secured to the other part. The fastening devices herein shown for this purpose consist of two sets of screw holes $d\ d$, $d'\ d'$ formed in said spacing bars, a set of screw holes $a'$ $a'$ in the chase A which register with the screw holes $d$ and another set of holes $b'\ b'$ in the recessed plate B, which register with the holes $d'$. Screws E E inserted either through the chase into the holes $d\ d$, as shown in Fig. 5, or through the recessed plate into the holes $d'\ d'$, as shown in Fig. 6, serve to secure the said bars to either plate. By employing two sets of holes, as described, the spacing bars may be detached from the chase and secured to the recessed plate without changing the position of the spacing bars relatively to the type form and the matrix made therefrom, it being obvious that if the spacing bars are secured to the chase by the screws E, the recessed plate with a filling of plastic material then pressed against the form, as seen in Fig. 5, and then removed and the plastic material allowed to harden, the spacing bars may be removed from the chase by the removal of the screws E, and then attached to the recessed plate by inserting the screws through the latter into the screw holes $d'\ d'$.

Registering pins or studs F F and sockets G G are provided in the marginal parts of the chase A and recessed plate B so that in placing the said chase and plate together they will come exactly in the proper relative position, the studs F F being shown secured in the chase and the sockets G G as being formed in the recessed plate. Coiled springs H H placed around said studs F F tend to separate the recessed plate from the chase, said springs being employed to facilitate the separation of the parts after the matrix has been formed.

In making rubber type sheets for the use of the apparatus described the type or relief plate, either of metal or wood, is placed and secured in the chase A, and the spacing strips D are then secured to the chase around the type form by means of the screws E which are inserted through the screw holes in the chase into the said bars. The recess of the plate B is then filled with the plastic material C of which the matrix is to be formed, and the recessed plate then applied to the chase in the manner shown in Fig. 5, and the pressure then applied to the two parts so as to force the plastic material against the face of the type. The spacing bars D fit at their outer edges closely against the inner surfaces of the walls $b$ of the recessed plate in the manner of a piston within a cylinder, so as to confine the plastic material at the time the pressure is applied, as clearly seen in Fig. 5. After the recessed plate and chase have been pressed against the form, in the manner described, the recessed plate with the plastic material, constituting the matrix, is removed, and the plastic material, if not already hard, either allowed to harden or subjected to the action of heat for hardening. The springs H H serve to aid in separating the chase from the recessed plate. After the plastic material is hard the spacing strips are removed from the chase and secured to the recessed plate, the prints of the bars in the material affording a guide by which the bars may be attached exactly in the proper place relatively to the matrix. Said bars are preferably grooved on their faces which rest against the plastic material in order to facilitate their replacement against the plastic material after the latter has become hard. The recessed plate with the plastic material therein and the spacing strips secured thereto will form a mold or matrix which is used in connection with the vulcanizing press of common form making the type sheets; that is to say, a sheet or mass of unvulcanized rubber is placed over the matrix and pressure is applied thereto by means of a plate or platen having a flat pressing surface which is brought into contact with the type surface of the spacing bars; the surplus rubber escaping through a notch $d^2$ which is formed in one of said bars for this purpose (Fig. 6). The rubber is vulcanized by being heated while subjected to pressure, in the manner described, as heretofore common.

The spacing bars $d'$ when secured to the recessed plate in the manner described and shown in Fig. 6, obviously constitute side walls for the matrix by which the rubber sheet formed in the matrix is made of uniform size and with uniform edges, while at the same time said spacing strips determine the distance to which the pressing surface or plate can approach the surface of the matrix at the time of pressing the rubber against the latter, so that all of the rubber type sheets made by such matrix will be of exactly the same thickness. This is of great importance in the manufacture of rubber type because the bodies of such type, when severed from the sheet by cutting, as is the common practice, will be of uniform height. It is obvious, however, that the thickness of the sheet of rubber after it is vulcanized is not determined by the thickness of the spacing bars, but depends upon the thickness of the chase; that is to say, the thickness of the rubber sheet will be equal to the difference between the height of the metal type or form and the thickness or height of the chase, the spacing strips obviously being forced into the plastic material a greater or less distance according to their thickness so that their surfaces which are outermost when secured to the recessed plate will project from the surface of the plastic material a distance sufficient to give a desired thickness to the vulcanized sheet. The vulcanized sheet will be made thicker or thinner by providing a chase which is thicker or thinner relatively to the type or form, and inasmuch as ordinary metal or wooden type will commonly be used in practice the chase itself will be made of exactly the thickness required according to the thickness desired in the finished type sheet.

It will of course be understood that the vulcanizing mold described may be used either for making rubber dies such as are used in hand printing stamps where all of the type are formed on one rubber sheet or block, or for making type sheets containing a large number of letters and which is afterwards severed to form separate types.

I claim as my invention—

1. The method of making matrices for rubber type which consists in securing metal type in a frame or chase, securing around the chase spacing bars, pressing against the type and the bars, the plastic material to form the matrix, and thereafter detaching the said bars from the chase and securing them to the matrix, substantially as described.

2. An apparatus for making rubber type comprising a chase in which the type are secured, a recessed plate for holding the plastic material which forms the matrix and spacing bars adapted for attachment either to the chase or to the recessed plate, substantially as described.

3. An apparatus for making rubber type comprising a chase, a recessed plate, spacing bars, and means for detachably securing the spacing bars the chase and the recessed plate, substantially as described.

4. An apparatus for making rubber type comprising a chase, a recessed plate, spacing bars made of proper size to enter within the side walls of the recessed plate, and adapted for attachment to either the chase or the recessed plate, substantially as described.

5. An apparatus for making rubber type, comprising a chase, a recessed plate, spacing bars made of proper size to enter within the side walls of the recessed plate, and means for detachably securing the said bars both to said chase and recessed plate, substantially as described.

6. An apparatus for making rubber type comprising a chase, a recessed plate, spacing bars adapted for attachment to either the chase or the recessed plate, said chase and recessed plate being provided with pins and sockets to hold them in register, substantially as described.

7. An apparatus for making rubber type comprising a chase, a recessed plate, spacing bars adapted for attachment either to the chase or to the recessed plate, one of said parts being provided with guide pins and the other with sockets for the same, and coiled springs placed around the pins to separate the recessed plate from the platen, substantially as described.

8. An apparatus for making rubber type comprising a chase a recessed plate, and spacing bars, said spacing bars being provided with screw holes, and both the chase and recessed plate being also provided with screw holes arranged opposite those of the spacing bars, whereby the latter may be attached either to the chase or to the recessed plate, substantially as described.

9. An apparatus for making rubber type comprising a chase, a recessed plate, and spacing bars adapted to fit within the side walls of the recessed plate, said spacing bars being provided with screw holes, and both the chase and recessed plate being provided with screw holes opposite those in the spacing bars, whereby the latter may be secured either to the chase or to the recessed plate, substantially as described.

In testimony that I claim the foregoing as my invention I affix my signature in presence of two witnesses.

LOUIS K. SCOTFORD.

Witnesses:
C. CLARENCE POOLE,
TAYLOR E. BROWN.